United States Patent [19]

Gioutsos

[11] Patent Number: 5,610,575
[45] Date of Patent: Mar. 11, 1997

[54] METHOD AND SYSTEM FOR DETECTING VEHICLE ROLL-OVER

[75] Inventor: Tony Gioutsos, Brighton, Mich.

[73] Assignee: Automotive Systems Laboratory, Inc., Farmington Hills, Mich.

[21] Appl. No.: 295,539

[22] Filed: Aug. 25, 1994

[51] Int. Cl.$^6$ .................................................. G08B 13/02
[52] U.S. Cl. ........................ 340/429; 340/436; 280/772; 364/424.055
[58] Field of Search .................................... 340/429, 436, 340/440, 686, 689; 180/282; 364/426.01, 424.05; 73/488, 495; 280/772

[56] References Cited

U.S. PATENT DOCUMENTS

| | | | |
|---|---|---|---|
| 4,078,224 | 3/1978 | Mize | 340/440 |
| 4,103,920 | 8/1978 | Smith | 280/112.2 |
| 5,202,831 | 4/1993 | Blackburn et al. | 364/424.05 |
| 5,261,506 | 11/1993 | Jost | 180/282 |
| 5,383,680 | 1/1995 | Bock et al. | 280/714 |
| 5,396,423 | 3/1995 | Fujimura et al. | 280/707 |
| 5,480,186 | 1/1996 | Smith | 280/714 |

OTHER PUBLICATIONS

"The Raisable Roll–Over Bar of the New Mercedes–Benz Roadster", Baumann et al, SAE Convergent Show 1990, SAE Technical Paper Series pp. 55–64.

Primary Examiner—Jeffery Hofsass
Assistant Examiner—Davetta Woods
Attorney, Agent, or Firm—Lyman R. Lyon, P.C.

[57] ABSTRACT

A method and system for detecting a vehicle roll-over utilizes a z-axis accelerometer (12) and a processor (20) for analyzing the accelerometer output (18) to provide early detection/prediction of a vehicle roll-over. The output signal (18) is substantially a positive constant value equal to the force of gravity when the vehicle (16) is in a normal upright condition, and as the vehicle (16) experiences a roll-over, the output signal transitions to a substantially negative constant value when the vehicle has rolled 180° upside down. To provide early roll-over detection and/or prediction, the z-axis data is averaged (102) and compared to a first threshold value (104) set to a g-force value within a range of 0 to −1 g. Estimating a slope value (step 110), i.e. the change in z-axis data over time, can provide an additional discrimination measure to improve overall reliability, and to provide a qualitative measure of the roll over.

6 Claims, 2 Drawing Sheets

METHOD AND SYSTEM FOR DETECTING VEHICLE ROLL-OVER

BACKGROUND OF THE INVENTION

The present invention relates generally to vehicle safety device actuation systems, and more particularly to a method and system for providing early and reliable vehicle roll-over detection.

Generally, typical vehicle roll-over detection systems utilize electro-mechanical sensors, such as mercury filled inclination sensors and/or gyroscopes, which are arranged to close a switch contact in response to the forces generated by a vehicle roll-over. Known systems have not proven wholly satisfactory because these sensors tend to rely on a mechanical action responsive to the vehicle rolling over which makes a high sensitivity and accuracy in roll-over detection difficult to obtain. Specifically, known systems tend to use sensors having thresholds which are tripped very late in the roll-over to provide a high degree of accuracy in the roll-over detection. However, waiting until very late in the roll-over to confirm a detection significantly degrades roll-over sensitivity. Reduced sensitivity correspondingly reduces the period of time in which appropriate vehicle safety devices can be actuated in response to a roll-over detection. The mechanical action is also subject to performance degradation over time.

Furthermore, some roll-over arrangements have attempted to increase reliability by utilizing a plurality of sensors positioned in different locations on the vehicle. However, each individual sensor tends to suffer from the sensitivity/reliability problem described above, while the overall system significantly increases the cost and physical space requirements for vehicle roll-over detection.

SUMMARY OF THE INVENTION

Therefore, an object of the present invention is to provide a vehicle roll-over detection method and system which significantly improves sensitivity and reliability.

A further object of the present invention is to provide a vehicle roll-over detection method and system which can provide early and reliable vehicle roll-over detection using a single sensor.

Another object of the present invention is to provide a vehicle roll-over detection method and system which utilizes signal processing on a sensor output signal to provide early and reliable roll-over detection.

Another object of the present invention is to provide an improved vehicle roll-over detection method and system which utilizes a plurality of different signal processing techniques on an accelerometer output to provide early and reliable roll-over detection.

In accordance with the present invention, a method for detecting roll-over of a vehicle comprises the steps of receiving vehicle data from a signal output by an accelerometer whose sensing axis is oriented substantially parallel to a gravitational force, averaging the vehicle data to filter out noise, and determining whether the averaged vehicle data exceeds a first predetermined threshold value. The first threshold value is representative of a g-force indicative of the vehicle beginning to roll-over. At least one vehicle safety device is actuated if the first predetermined threshold is exceeded.

The method can further comprise the steps of estimating a slope value representative of a change over time in the averaged data, determining whether the slope value exceeds a second predetermined threshold value, and actuating the at least safety device if both the first and second threshold values are exceeded. In addition, a step of further analyzing the received data using at least one additional discrimination process can be performed, wherein the at least one additional discrimination process has a corresponding threshold value, and the at least one vehicle safety device is actuated only when all threshold values have been exceeded.

In operation, the accelerator output signal is substantially a positive constant value equal to the force of gravity when the vehicle is in a normal upright condition. When the vehicle experiences a roll-over, the output signal transitions to about zero as the vehicle has rolled on a side, and to a substantially negative constant value when the vehicle has rolled upside down. To provide early roll-over detection and/or prediction, the first threshold value is set to a g-force value within a range of 0 to $-1$ g. The estimate of the slope value can provide an additional discrimination measure to improve overall reliability, and can provide a qualitative measure of the roll-over, i.e., the greater the negative slope value, the more violent the roll-over.

In further accordance with the present invention, a system for detecting roll-over of a vehicle comprises an accelerometer mounted to the vehicle in such a manner that the accelerometer's sensing axis is oriented substantially parallel to a gravitational force, and a processor means for analyzing a signal output by the accelerometer. The processor means comprises a means for receiving the accelerometer output signal as vehicle data, a means for filtering noise from the vehicle data, a means for comparing the filtered vehicle data to a first predetermined threshold, and a means for producing a roll-over detection signal if the first threshold is exceeded. A means for actuating at least one vehicle safety device actuates the device(s) in response to the roll-over detection signal.

The processor means can further comprise a means for estimating a slope value representative of a change over time in the averaged data, and a means for comparing the slope value to a second predetermined threshold value. The means for producing the roll-over detection signal will only produce the signal if both the first and second threshold values are exceeded.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
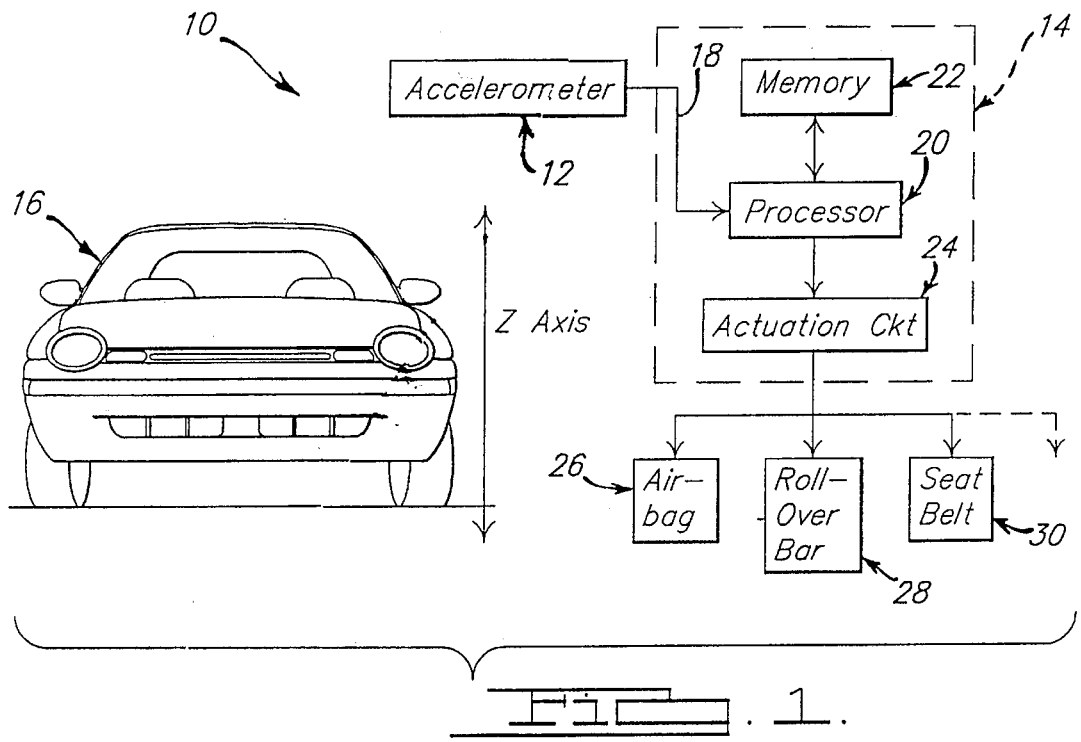
FIG. 1 is a block diagram circuit of a vehicle roll-over detection system in accordance with the present invention.

FIG. 1 shows a block diagram circuit of a vehicle roll-over detection system 10 in accordance with the present invention. Roll-over detection system 10 is primarily formed from a z-axis accelerometer 12 coupled to a control unit 14. Accelerometer 12 is positioned within a vehicle 16 so that the accelerometer's sensing axis is oriented parallel to a gravitational force, or perpendicular to the normal plane of travel (i.e., the "z-axis").

Figure 2A:
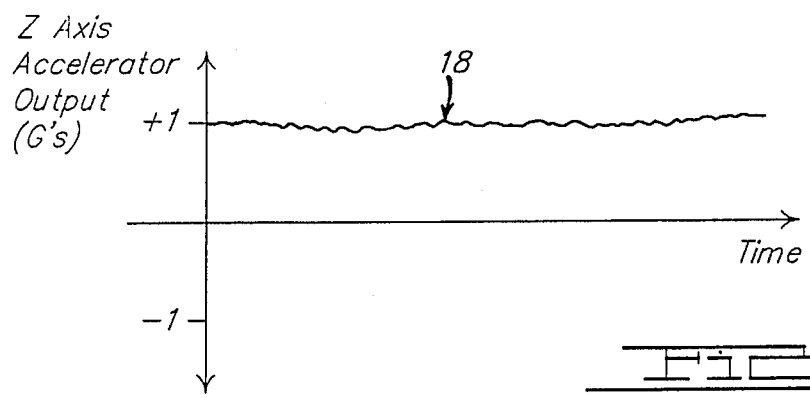
FIGS. 2(a) and (b) are graphs illustrating the output of a z-axis accelerometer in accordance with the present invention.
Figure 2B:
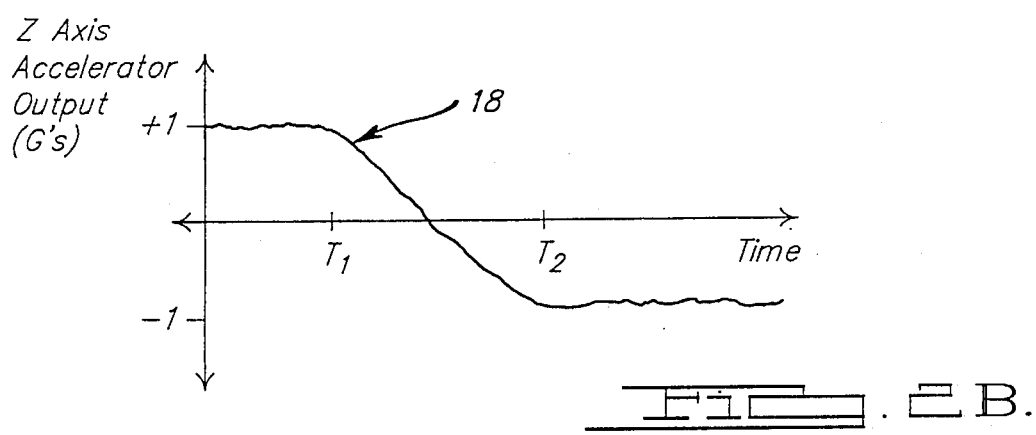

The z-axis accelerometer 12 produces an analog output 18 responsive to the orientation of the vehicle 16 relative to the ground. More specifically, as seen in FIG. 2(*a*), the z-axis accelerometer output 18 normally produces a relatively steady state +1 g output responsive to the earth's gravitational field when all of the vehicle's wheels are properly contacting the ground. However, as seen in FIG. 2(*b*), the output 18 translates from a +1 g output to a −1 g output during a vehicle roll-over. The actual roll-over and corresponding sensor output translation lasts for a time period of $T_2-T_1$ seconds, which is typically on the order of ≈3 seconds.

The accelerometer output 18 is supplied to a processor unit 20 located within control unit 14 for monitoring and evaluation. The overall operation of processor 20 is more fully described hereinbelow in context with FIGS. 3 and 4. The processor unit 20 utilizes a memory arrangement 22 for tracking and/or storing accelerometer output data samples received over periods of time. The memory arrangement 22 can be implemented in a manner well known to one having ordinary skill in the art, such as by using one or more RAM or EEPROM memory chips.

The processor generates a roll-over detection output for controlling the triggering of an actuation circuit 24. In response to a roll-over detection signal, the actuation circuit 24 is arranged to operate one or more vehicle safety devices such as an air bag inhibitor 26, roll-over bar 28, and a seat belt pretensioner 30. One of ordinary skill will appreciate that other devices can be operated, such as unlocking vehicle door locks and disabling the vehicle fuel supply system.

Figure 3:
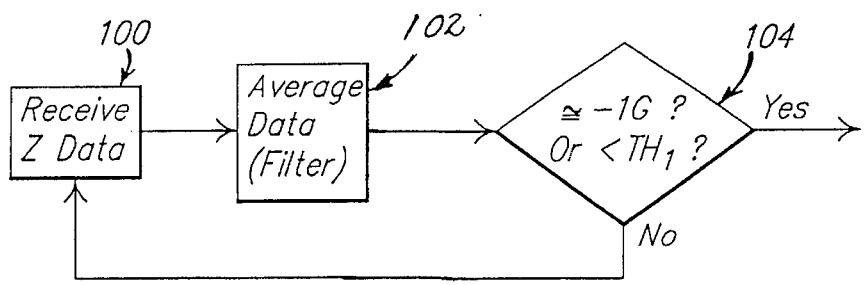
FIG. 3 is a flow chart showing a first embodiment of the roll-over detection system operation.

As shown in FIG. 3, the processor 20 of the present invention receives z-axis data at step 100, averages the individual z-axis data samples over a predetermined sampling time period at step 102, and if the averaged z-axis data indicates a force approximately equal to a −1 g measure at step 104, a roll-over has been detected. If the average data indicates a force greater than a −1 g measure, the processor 20 then generates a new average using the next z-axis data sample.

The average of the z-axis data samples at step 102 improves discrimination reliability by filtering out external noise from the accelerometer output 18. More specifically, external noise sources such as rough road conditions, or electromagnetic interference (EMI) noise generated by other electrical components, typically produce noise having a z-axis component greater than 1 Hz. Averaging the z-axis data samples over a sampling time period of at least 1 second effectively filters out all noise having a frequency greater than 1 Hz. The filtering can be achieved with a simple average, median filter, or digital filter arrangement.

Further, the present invention advantageously provides a method which allows early and reliable prediction of a vehicle roll-over. More specifically, instead of using a discrimination threshold of −1 g at step 104, a prediction threshold ($TH_1$) of between 0 and −1 g provides an indication that the vehicle is on its side and heading toward a complete 180° roll-over. Therefore, adjusting the discrimination analysis by using a prediction threshold ($TH_1$) provides a reliable indication that a vehicle is beginning to experience roll-over, thereby allowing the system to predict a roll-over to permit earlier deployment of the appropriate vehicle safety devices. For example, using a $TH_1$ threshold of ≈−0.24 g provides a good indication that the vehicle has just begun to roll from its side toward its roof.

Figure 4:
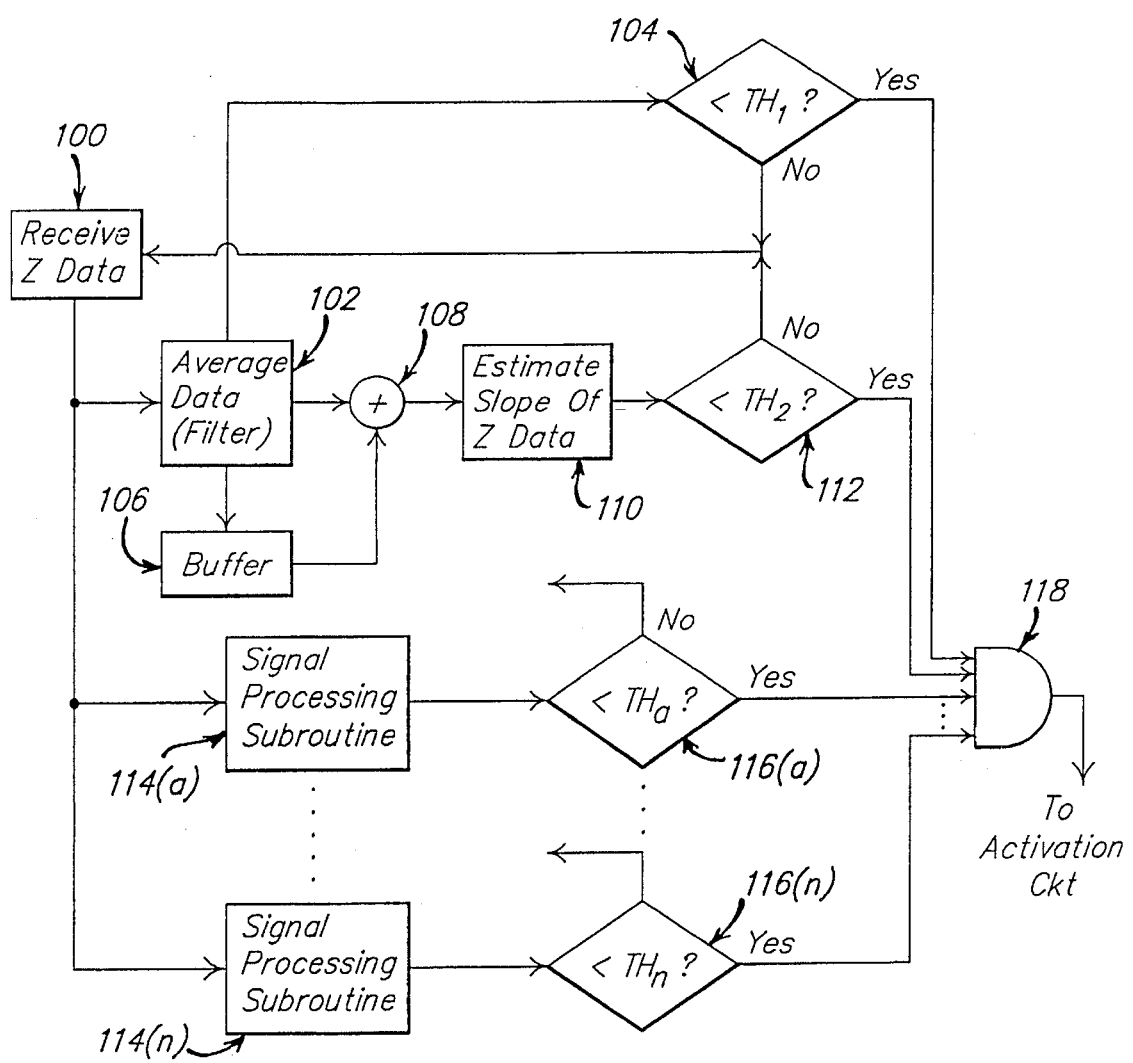
FIG. 4 is a flow chart showing a further embodiment of the present invention.

As shown in FIG. 4, the reliability and performance of the roll-over prediction/discrimination analysis of the present invention can be enhanced by incorporating additional discrimination analysis subroutines into the method of FIG. 3. More specifically, roll-over of the vehicle can be verified and/or the severity of the roll-over can be measured by analyzing the rate of change (i.e. the slope) of the averaged z-axis data samples. Thus, averaged z-axis data samples are buffered at step 106 to generate a record of past data samples. The past data sample is then combined with the most current averaged z-axis data samples at step 108 so that the slope of the z-axis data samples plotted over time can be estimated at step 110. The estimated slope is then compared to a predetermined threshold value $TH_2$ at step 112, to provide a qualitative evaluation of the roll-over.

As further shown in FIG. 4, the overall roll-over analysis can be supplemented with one or more optional discrimination subroutines, which utilize the received vehicle data to generate different event measures. Each respective processing subroutine would be supplied with the received z-axis data to provide appropriate data processing at a step 114(*a*) to (*n*), and to determine whether a respective subroutines analysis threshold $TH_{a-n}$ has been exceeded at a step 116(*a*) to (*n*). Examples of suitable discrimination subroutines are signal processing arrangements which track the energy of the received z-axis data in a particular frequency band, measure the variance of the z-axis data waveform over time, and/or monitor occupant position relative to fixed structure within the vehicle. However, one of ordinary skill in the art will readily appreciate that the above noted examples of suitable discrimination subroutines are not to be construed as limiting. Further, outputs from other binary or analog inclination sensors, such as from a mercury switch arranged to close a contact if the vehicle has reached a predetermined inclination, can be added to the roll-over discrimination analysis. A voting circuit can be added to weight and/or analyze the various discrimination subroutine outputs, thereby significantly reducing the likelihood of a false detection, such as might occur due to the vehicle taking a curve at high speed.

As shown symbolically in FIG. 4, a "yes" determination at each of the steps 104, 112 and 116(*a*) to (*n*) causes a respective input line to an AND gate 118 to go high. If all of the subroutines have provided an indication/prediction that the vehicle is in a roll-over, the AND gate 118 provides the roll-over detection signal to the actuation circuit 24. The optional voting circuit noted above can be incorporated into the AND gate operation, or alternatively can provide an input to the AND gate by operating as a prioritizing circuit which receives two or more of the subroutine outputs.

Therefore, the present invention provides a vehicle roll-over discrimination analysis which advantageously utilizes signal processing of a z-axis accelerometer output to allow the present invention to reliably predict and detect a vehicle roll-over. This in turn permits early deployment of vehicle safety devices and/or provides the discrimination analysis additional time to analyze further information before triggering deployment of the safety devices. In addition to providing early and reliable predictions of a vehicle roll-over, the present invention further allows the z-axis data to be qualitatively analyzed to determine roll-over severity.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. A method for detecting roll-over of a vehicle comprising the steps of:

receiving vehicle data from a signal output by an accelerometer, said accelerometer having a sensing axis oriented substantially parallel to a gravitational force;

averaging said vehicle data to filter out noise;

determining whether the averaged vehicle data exceeds a first predetermined threshold value, said first threshold value being representative of a g-force indicative of the vehicle beginning to roll-over;

estimating a slope value representative of a change over time in the averaged data;

determining whether the slope value exceeds a second predetermined threshold value; and actuating at least one safety device if both said first and second threshold values are exceeded.

2. The method of claim 1 wherein said accelerometer output signal is substantially a positive constant value equal the force of gravity, and when the vehicle experiences a roll-over, the output signal transitions to about zero as the vehicle has rolled on a side, and a substantially negative constant value when the vehicle has rolled 180° upside down.

3. The method of claim 2 wherein said first predetermined threshold value is within the range of zero to the negative constant value.

4. The method of claim 1 further comprising the steps of:

analyzing the received data using at least one additional discrimination process;

said at least one additional discrimination process having a corresponding threshold value; and actuating said at least one vehicle safety device only when all threshold values have been exceeded.

5. A system for detecting roll-over of a vehicle comprising:

an accelerometer mounted to the vehicle, said accelerometer having a sensing axis oriented substantially parallel to a gravitational force;

a processor means for analyzing a signal output by said accelerometer, said processor means comprising:

means for receiving the accelerometer output signal as vehicle data;

means for filter noise from said vehicle data;

means for comparing said filtered vehicle data to a first predetermined threshold representative of a g-force indicative of the vehicle beginning to roll-over;

means for producing a roll-over detection signal if the first threshold is exceeded;

means for estimating a slope value representative of a change over time in the averaged data; and means for comparing the slope value to a second predetermined threshold value, wherein said means for producing the roll-over detection signal only produces the signal if both the first and second threshold values are exceeded; and means for actuating at least one vehicle safety device in response to said roll-over detection signal.

6. The system of claim 5 wherein the first predetermined threshold value is representative of a gravitational force within a range of 0 to −1 g.

* * * * *